United States Patent
Cromer et al.

(10) Patent No.: US 7,941,657 B2
(45) Date of Patent: *May 10, 2011

(54) MULTI-MODE MOBILE COMPUTER WITH HYPERVISOR AFFORDING DISKLESS AND LOCAL DISK OPERATING ENVIRONMENTS

(75) Inventors: Daryl Cromer, Cary, NC (US); Richard W. Cheston, Morrisville, NC (US); Howard Locker, Cary, NC (US); Randall S. Springfield, Chapel Hill, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 788 days.

This patent is subject to a terminal disclaimer.

(21) Appl. No.: 11/694,634

(22) Filed: Mar. 30, 2007

(65) Prior Publication Data
US 2008/0244254 A1 Oct. 2, 2008

(51) Int. Cl.
*G06F 15/177* (2006.01)
(52) U.S. Cl. .............................. 713/2; 718/1
(58) Field of Classification Search ........... 713/2; 718/1
See application file for complete search history.

(56) References Cited

U.S. PATENT DOCUMENTS

| | | | |
|---|---|---|---|
| 4,780,821 A | 10/1988 | Crossley | |
| 5,659,756 A | 8/1997 | Hefferon et al. | |
| 6,629,162 B1 | 9/2003 | Arndt et al. | |
| 6,678,712 B1 | 1/2004 | McLaren et al. | |
| 6,735,601 B1 | 5/2004 | Subrahmanyam | |
| 7,093,035 B2 | 8/2005 | Hashimoto | |
| 7,360,072 B1 | 4/2008 | Soltis et al. | |
| 2002/0010811 A1 | 1/2002 | Arndt et al. | |
| 2002/0095437 A1 | 7/2002 | Sugiyama | 707/204 |
| 2002/0124127 A1 | 9/2002 | Dawkins et al. | |
| 2002/0157001 A1 | 10/2002 | Huang et al. | 713/2 |
| 2003/0159086 A1 | 8/2003 | Arndt | |
| 2003/0204708 A1 | 10/2003 | Hulme et al. | 713/1 |
| 2005/0193189 A1 | 9/2005 | Kim | |
| 2005/0204186 A1 | 9/2005 | Rothman et al. | |
| 2005/0283640 A1 | 12/2005 | Cheston et al. | |
| 2006/0010314 A1 | 1/2006 | Xu | |
| 2006/0015931 A1 | 1/2006 | Davis et al. | |
| 2006/0021032 A1 | 1/2006 | Challener et al. | |
| 2006/0021041 A1 | 1/2006 | Challener et al. | |
| 2006/0143417 A1 | 6/2006 | Poisner et al. | |
| 2007/0005816 A1 | 1/2007 | Diamant et al. | |
| 2007/0006049 A1 | 1/2007 | Agha et al. | |

(Continued)

FOREIGN PATENT DOCUMENTS

DE 102005030529 1/2007

(Continued)

OTHER PUBLICATIONS

Operating system choice based on connection domain IP.COM, Journal Jun. 20, 2003. XP 013008895.

(Continued)

*Primary Examiner* — Albert Wang
(74) *Attorney, Agent, or Firm* — Ference & Associates LLC

(57) ABSTRACT

A mobile device, such as a laptop or notebook computer, capable of booting from at least two environments. If a remote environment is present, the mobile device may boot from the remote environment. The mobile device may also boot from the local environment.

20 Claims, 4 Drawing Sheets

U.S. PATENT DOCUMENTS

| | | | |
|---|---|---|---|
| 2007/0011445 A1 | 1/2007 | Waltermann et al. | |
| 2007/0038996 A1 | 2/2007 | Ben-Yehuda et al. | |
| 2007/0050767 A1 | 3/2007 | Grobman et al. | |
| 2007/0266389 A1 | 11/2007 | Ganguly et al. | |
| 2008/0148389 A1 | 6/2008 | Locker et al. | |
| 2008/0244096 A1* | 10/2008 | Springfield et al. | 710/5 |
| 2009/0172136 A1* | 7/2009 | Schulz et al. | 709/222 |

FOREIGN PATENT DOCUMENTS

| | | |
|---|---|---|
| EP | 1424628 | 6/2004 |
| EP | 1507188 A2 | 2/2005 |
| JP | S64-004838 | 10/1989 |
| WO | 2007003152 | 1/2007 |

OTHER PUBLICATIONS

International Search Report for PCT/IB2008/052452.

Wenyuan Kuang et al, "A novel centralized managed computing system for heterogeneous OSes", Proceedings of 2007 First International Symposium on Information Technologies and Applications in Education (ISIT AE 2007). Nov. 23-25, 2007, pp. 428-433.

R.P. Goldberg, "Survey of Virtual Machine Research", Computer, Jun. 1974, pp. 34-35.

UKPO, Copy of Examination Report for GB0724534.3 dated Dec. 3, 2010, pp. 1-5.

Website, 7 pages, available at http://en.wikipedia.org/wiki/Hypervisor, as of Mar. 1, 2011.

* cited by examiner

MULTI-MODE MOBILE COMPUTER WITH HYPERVISOR AFFORDING DISKLESS AND LOCAL DISK OPERATING ENVIRONMENTS

FIELD OF THE INVENTION

This invention relates generally to network computing systems, and in particular, to remotely managed computers. Still, more particularly, the present invention relates to a method and system for having a mobile computing system operate as a remotely managed computer or as a stand alone computer.

BACKGROUND OF THE INVENTION

One area of background entails bootstrapping of an operating system (OS). When a computer is powered on, the binary image of its OS must first be loaded into memory from a storage device in order for the OS to be set running and controlling the whole computer system. In order to load the OS, booting or boot strapping mechanisms are conventionally used to initiate or start the computer system running.

Traditionally, the OS was bootstrapped from a hard disk drive of the computer. Conventional computer systems, including most mobile computers, keep all the essential hardware components including the hard disk from which the computer bootstraps (or "boots" for short) its operating system collocated within the one enclosure, such as the housing of the computer, whether a so called desktop or notebook type model. It has been recognized, however, that in some circumstances it may be desirable for a computer system to be constructed in such a way that the system hard disk containing the operating system and even the computer user's own data is not collocated or is kept physically separated from the rest of the whole computer system.

Accordingly, an ongoing trend among smaller and larger enterprises alike is to provide a diskless client that eliminates the need for each computing system in the network to have a hard drive. Such diskless clients are generally desktop type computing systems and typically bootstrap their operating systems from network servers over an internet or intranet connection. With all data being on a central server, file management can be controlled at the one central location. System backup is greatly facilitated since a multitude of computing systems not need to be activated at the time that backup is carried out, and any needed "patch management" can be carried out at the server end.

There are a variety of known processes for implementing a remote bootstrap for use in a diskless client. One such way is a PXE (Preboot Execution Environment) boot. Another such way is utilizing the iSCSI (Internet Small Computer Systems Interface) protocol. Additional information on PXE boots is available in the Preboot Execution Environment (PXE) Specification (http colon dot dot slash slash www dot pix dot net slash software slash pxeboot slash archive slash pxespec dot pdf). Additional information on the iSCSI protocol is available in RFC 3720. (http colon slash slash www dot faqs dot org slash rfcs slash rfc3720 dot html).

Such diskless clients, however, have problems and limitations. The most significant limitation is that the client computer is dependent upon a consistent and persistent connection to the network server containing the OS image. As such, diskless clients have tended to be stationary machines such as desktops, and not mobile machines, such as notebooks.

Another area of background entails virtual machines and virtual machine monitors which arose out of the need to run applications written for different operating systems concurrently on a common hardware platform, or for the full utilization of available hardware resources. Virtual machine monitors were the subject of research since the late 1960's and came to be known as the "Virtual Machine Monitor" (VMM). Persons of ordinary skill in the art are urged to refer to, for example, R. P. Goldberg, "Survey of Virtual Machine Research," IEEE Computer, Vol. 7, No. 6, 1974. During the 1970's, as a further example, International Business Machines Corporation adopted a virtual machine monitor for use in its VM/370 system.

A virtual machine monitor, sometimes referred to in the literature as the "hypervisor," is a thin piece of software that runs directly on top of the hardware and virtualizes all the hardware resources of the machine. Since the virtual machine monitor's interface is the same as the hardware interface of the machine, an operating system cannot determine the presence of the VMM. Consequently, when the hardware interface is one-for-one compatible with the underlying hardware, the same operating system can run either on top of the virtual machine monitor or on top of the raw hardware. It is then possible to run multiple instances of operating systems or merely instances of operating system kernels if only a small subset of system resources are needed. Each instance is referred to as a virtual machine. The operating system can be replicated across virtual machines or distinctively different operating systems can be used for each virtual machine. In any case, the virtual machines are entirely autonomous and depend on the virtual machine monitor for access to the hardware resources such as hardware interrupts.

SUMMARY OF THE INVENTION

In summary, one aspect of the invention provides a system comprising: a mobile device; a hypervisor loaded in the mobile device; the hypervisor acting to afford a first mode of operation of the mobile device and a second mode of operation of the mobile device, the first mode of operation being associated with a first operating environment and the second mode of operation being associated with a second operating environment.

Another aspect of the invention provides a method comprising: loading a hypervisor in a mobile device; with the hypervisor, affording a first mode of operation of the mobile device and a second mode of operation of the mobile device, the first mode of operation being associated with a first operating environment and the second mode of operation being associated with a second operating environment.

Furthermore, an additional aspect of the invention provides a program storage device readable by machine, tangibly embodying a program of instructions executable by the machine to perform a method comprising: loading a hypervisor in a mobile device; with the hypervisor, affording a first mode of operation of the mobile device and a second mode of operation of the mobile device, the first mode of operation being associated with a first operating environment and the second mode of operation being associated with a second operating environment.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, in which like numerals indicate like elements or steps throughout the several views, a preferred embodiment of the present invention will be described. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
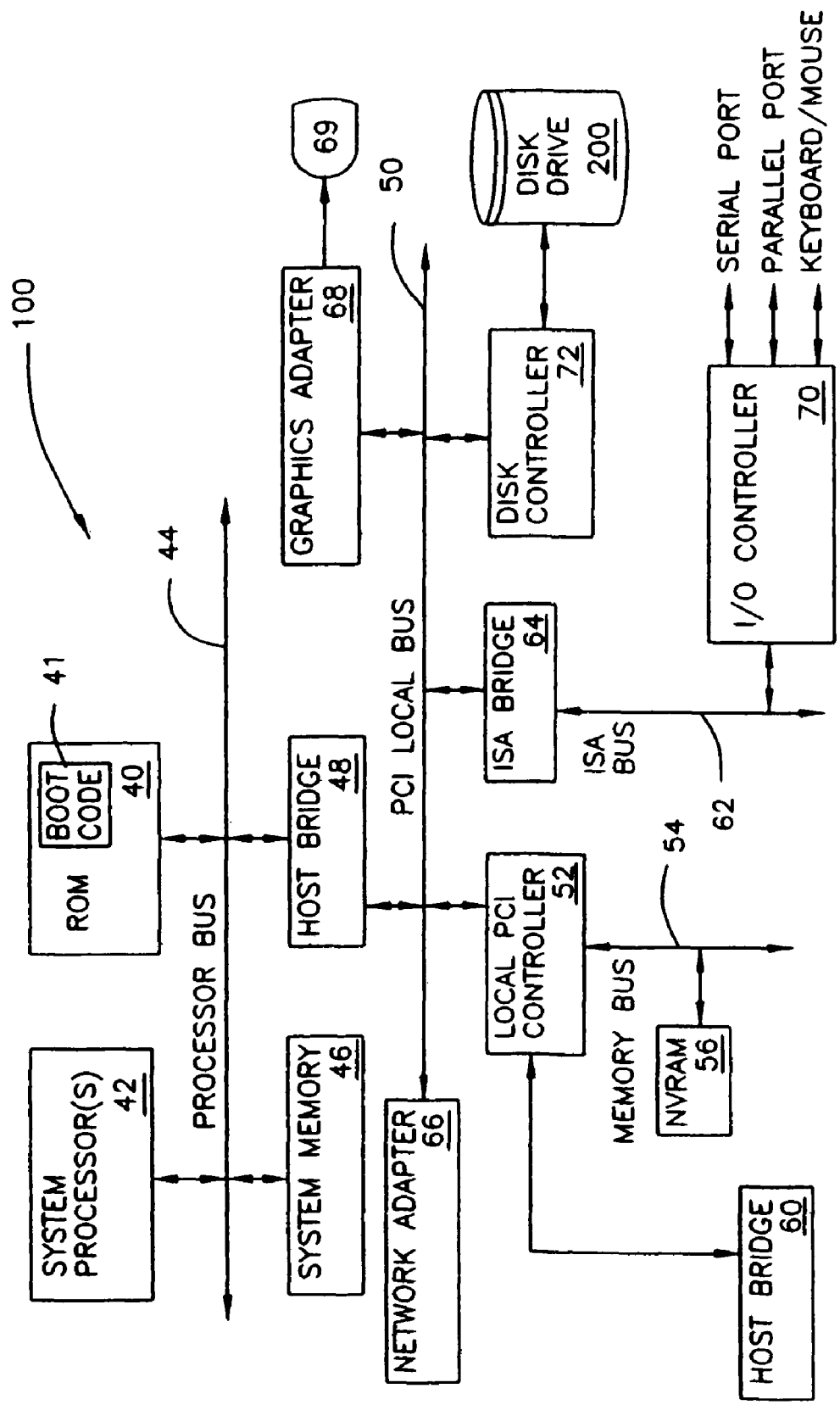
FIG. 1 is a block diagram of a computer system according to a preferred embodiment of the present invention which incorporates resources which enables a mobile computing system to operate as a remotely managed computer or as a stand alone computer.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Purchase; however, as will become apparent from the following description, the present invention is applicable to multi-mode operation by any data processing system.

As shown in FIG. 1, computer system 12 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

Figure 2:
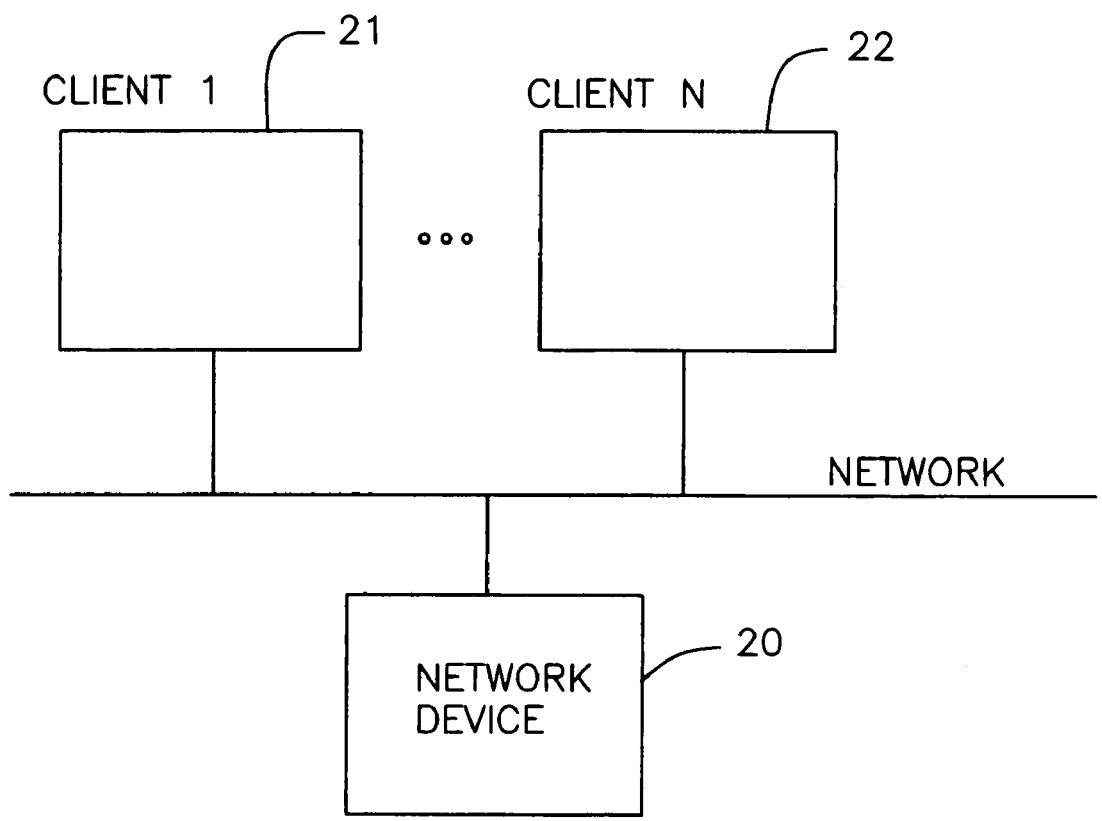
FIG. 2 is an illustration showing an exemplary computer network where client computers bootstrap from a remote device.

Some computers including diskless computers bootstrap their operating systems from remote storage over an internet or intranet connection. FIG. 2 shows an example of a network having such remote storage and multiple clients. It should be appreciated the network connection may be of any variety, including wired or wireless. During the network-based booting process, the client computers 21, 22 send out packet(s) requesting files necessary for bootstrapping from the remote storage 20, then the remote storage 20 replies to the client computer 21, 22 with appropriate boot files. It should be appreciated that the booting in this example includes booting through a server computer (or server process executing on a computer) over the network or booting from a storage device that is directly attached to the network without an interposed server computer having its own processor or CPU, memory, and executing operating system and application program.

The disclosure now turns to a discussion of implementations that may be manifested or carried out in accordance with at least one preferred embodiment of the present invention. Though additional figures are discussed here below, simultaneous reference can still be made to FIGS. 1 and 2; more particularly, simultaneous reference can be made to all figures to the extent needed.

Figure 3:
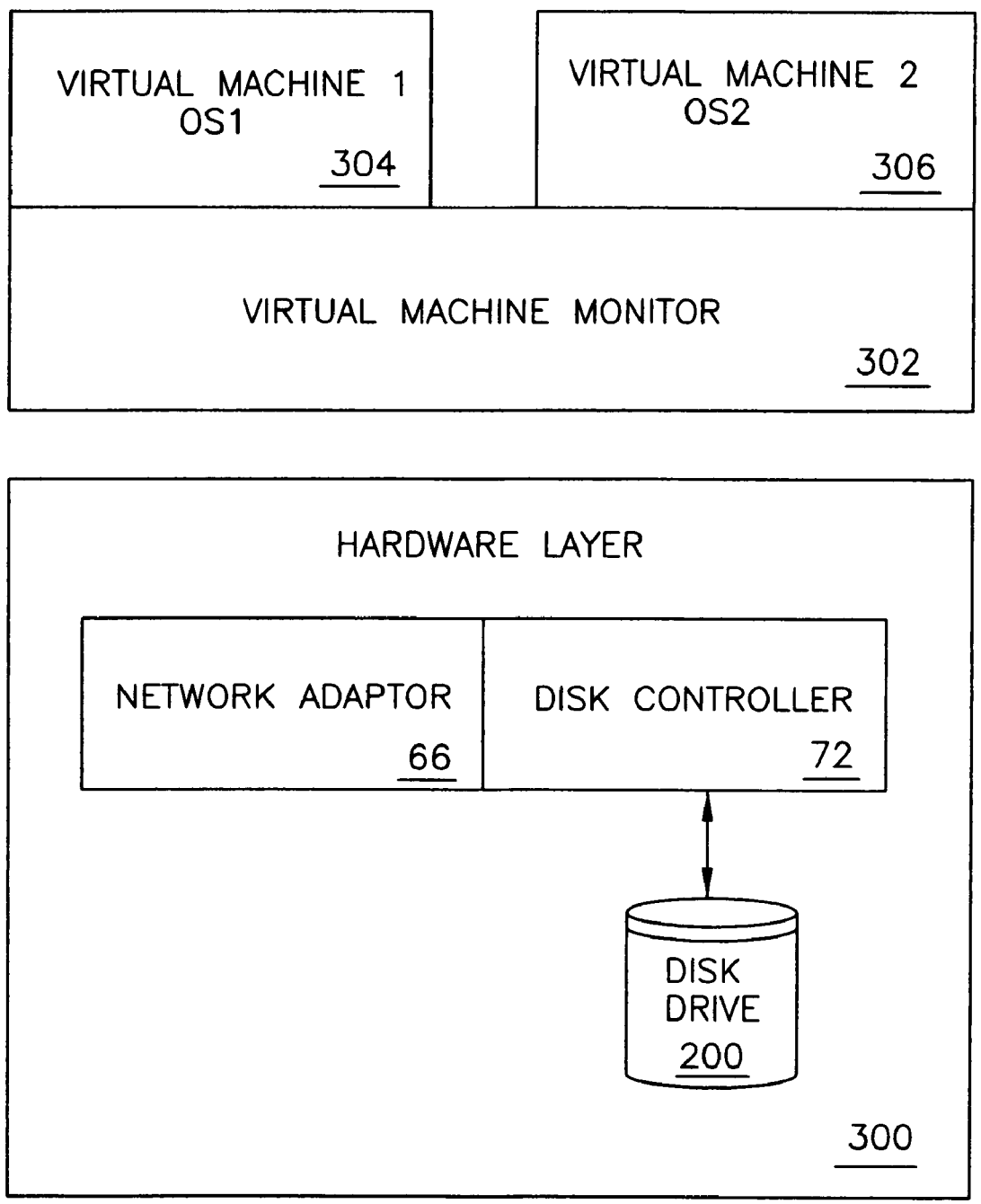
FIG. 3 is a system virtualization layer diagram showing the abstraction layers in a computer system running virtualization software according to one embodiment of the present invention in which a virtual machine monitor is employed to implement alternative booting in lieu of a hardware implemented controller.

FIG. 3 is a system virtualization layer diagram showing the abstraction layers in a computer system running virtualization software according to one embodiment of the present invention in which a virtual machine monitor is employed to implement the an embodiment of the present invention in lieu of a hardware-implemented controller. According to this embodiment, specialized hardware is not required. At the lowest level of abstraction is the hardware layer 300; this is the physical hardware layer of the computer system. A Virtual Machine Monitor layer 302 is an intermediary layer which sits on top of the hardware layer 300 and intercepts all access attempts to network adapter 66 and disk controller 72 by software running on the computer system.

Though essentially any suitable Virtual Machine Monitor (hypervisor) may be used in accordance with the embodiments of the present invention, the "Xen" hypervisor is the presently preferred hypervisor. The Xen hypervisor is an open source software development. Additional information about a Xen hypervisor may be found at http colon slash slash www xensource dot com. Furthermore, the functions of a Virtual Machine Monitor may be implemented either in software or in hardware, such as at least one Integrated Circuit or part of at least one Integrated Circuit. Thus, it is to be understood that the inventive concepts described herein may be implemented in hardware, software, or a combination of both.

At the highest level of abstraction lie the virtual machines 304 and 306 which ultimately run operating systems and software applications. While only two virtual machines are shown, additional virtual machines may be utilized. Virtual machines are configured so as not to know of the existence of other virtual machines. Virtual machine 304 is preferably configured to afford diskless operation in connection with OS1 from an external source such as a network device 20, while virtual machine 306 is preferably configured to afford operation in connection with OS2 from a local source, such disk drive 200.

Generally, it should be appreciated that OS1, OS2, network device 20 and disk drive 200 are shown here merely by way of example. As such, it should be appreciated that in accordance with at least one presently preferred embodiment of the present invention, there is broadly contemplated the concept of a virtual machine monitor (or hypervisor) encompassing at least two virtual machines (or sessions) wherein one is configured for interface with a first context or environment and the other is configured for interface with a second context or environment. In an advantageous refinement of at least one embodiment of the present invention, one of these environments is external and the other is local. Accordingly, in the illustrative example shown, the external environment is a network such as an enterprise network while the local environment is a local OS with a disk drive. However, the embodiments of the present invention are clearly applicable to a wide variety of other context s and settings.

In accordance with a particularly preferred embodiment of the present invention, the device 100, by way of virtual machine monitor 302, will be able to flexibly transition between one virtual machine and the other, depending upon predetermined criteria as defined by the prevailing operating paradigm. As touched on above, device 100 can function as a diskless device in the presence of a consistent and persistent connection to the network device containing the OS image (through network adapter 66 with virtual machine 304 blocking access to disk drive 200 to totally control the image/date when device 100 is being booted remotely in the secure network). Preferably, the virtual machine monitor 302 can make a determination as to whether such a consistent and persistent connection is even possible, for example, given prevailing conditions on the network or the absence of the network device on the network. By way of non-limiting example, the Virtual Machine Monitor can check for the presence of the network device on the network using common internet protocol (IP) commands such as ping, etc. If it is determined that a needed connection is not available, then virtual machine 304 preferably hibernates and virtual machine 306 is active for traditional local operation via OS2. Thus, by way of a non-restrictive example, for instance, virtual machine 306 could permit full complete access to the disk drive 200. Depending on the reason the needed connection is not available, virtual machine 306 may also permit access to network adapter 66 if the network is operational so that the machine may have access to available network resources or block access altogether to network adapter 66.

Different operating modes via virtual machines 304 and 306 can well be appreciated. For instance, virtual machine 304 can afford an interfacing with and undertaking of secure or sensitive operations (inherent to the network device 20) while virtual machine 306 can afford an interfacing with and undertaking of less secure or sensitive operations. Thus, for instance, this could help obviate a condition where a user could otherwise download sensitive or classified information onto the device 100 from an external source; here, such high-risk applications could be available solely via virtual machine 304, with no downloading possible.

A third mode is conceivable in accordance with an embodiment of the present invention. Here, the diskless network could act in a "client-server" mode, where the virtual machine monitor 302 can preferably install an application and data from an external source into yet another virtual machine (not shown) that is integral with disk drive 200 and thus is not subject to a need for consistent and persistent network connection (other than, of course, the installation). This is clearly a less secure mode, but it can add significant convenience for ordinary applications or that is not of a sensitive, high-risk or classified nature.

Figure 4:
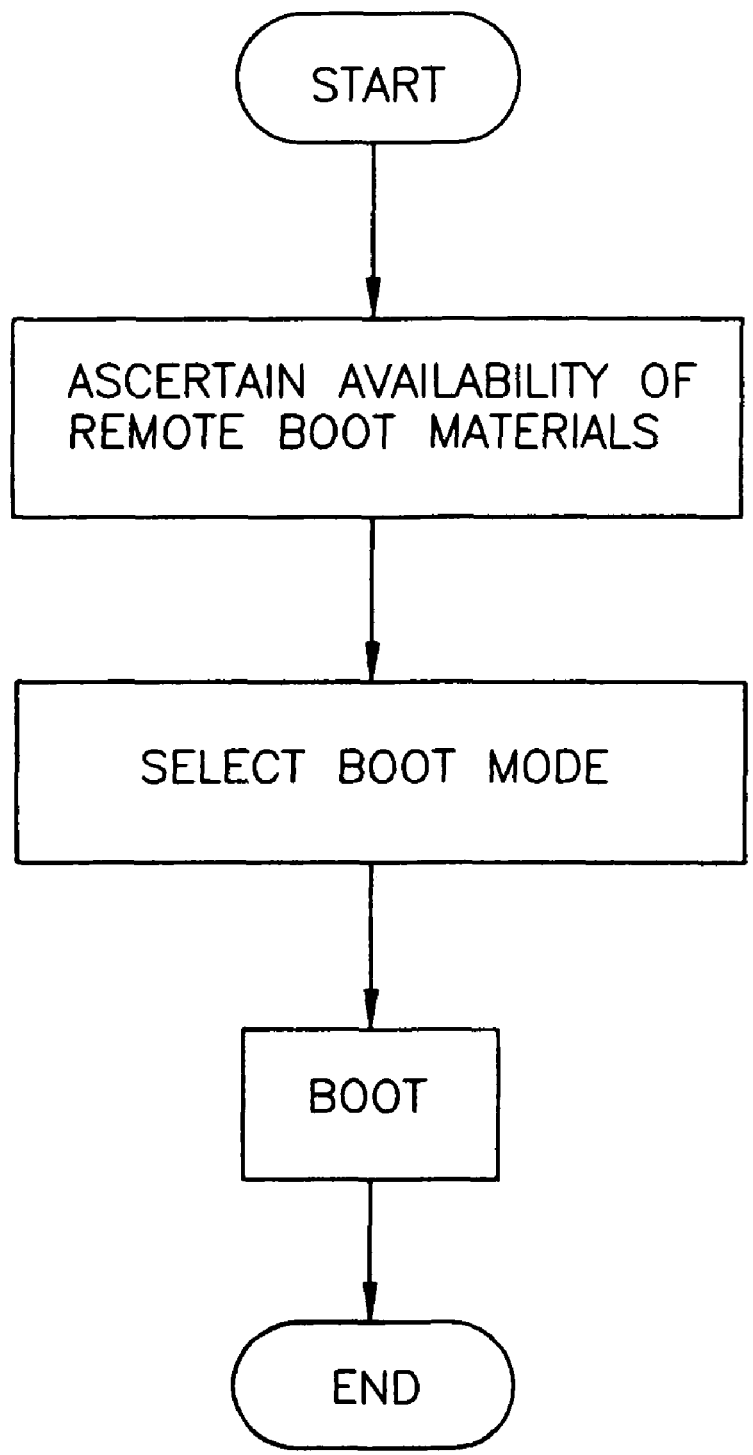
FIG. 4 is a flow diagram depicting the logic for a virtual machine monitor according to one embodiment of the present invention

FIG. 4 is a flow diagram depicting the logic utilized for a virtual machine monitor according to one embodiment of the present invention. The virtual machine monitor (hypervisor) first ascertains the availability of remote boot materials. By way of example, evaluating the existence of a consistent and persistent network connection through network adapter 66. Alternatively, user preferences could also be utilized, by way of example, although if the user was currently in an environment where there was a consistent and persistent network connection but intended to move out of such environment. Once the availability of remote boot materials as been ascertained, the virtual machine monitor selects the boot mode and then implements the boot as described above.

The embodiment shown in FIG. 4 can be implemented as a virtual machine manager as described in relation to FIG. 3.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

The order of steps given herein is for exemplary purposes only and should not be interpreted as limiting with respect to other embodiments which are possible using a different order of steps in implementing the inventive concepts described herein. Any ordering of steps in the claims are for the purpose of improving clarity and do not imply any particular order of steps to be taken.

In the drawings and specifications there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety herein.

What is claimed is:

1. A system comprising:
   a mobile device; and
   a hypervisor loaded in said mobile device;
   said hypervisor acting to afford a first mode of operation of said mobile device and a second mode of operation of said mobile device, the first mode of operation being associated with a diskless operating environment and the second mode of operation being associated with a local disk operating environment
   wherein said hypervisor, responsive to one or more predetermined criteria, is configured to hibernate the first mode of operation and afford the second mode of operation.

2. The system according to claim 1, wherein said hypervisor acts to afford diskless operation in said first mode of operation responsive to a determination that a needed network connection is available.

3. The system according to claim 1, wherein the first mode of operation is associated with an external environment.

4. The system according to claim 3, wherein the external environment is an external network.

5. The system according to claim 1, wherein said hypervisor acts to afford local operation in said second mode of operation responsive to a determination that a needed network connection is not available.

6. The system according to claim 1, wherein the second mode of operation is associated with a local environment.

7. The system according to claim 6, wherein:
said mobile device comprises an operating system;
said local environment comprises said operating system.

8. The system according to claim 7, wherein:
said mobile device further comprises a hard disk drive;
said local environment further comprises said hard disk drive.

9. The system according to claim 1, wherein said hypervisor further acts to afford a third mode of operation of said mobile device, the third mode of operation being associated with both of the diskless and local disk operating environments.

10. The system according to claim 9, wherein the diskless operating environment is an external environment and the local disk operating environment is a local environment.

11. The system according go claim 10, wherein said hypervisor acts to accept input from the external environment for use in the local environment.

12. A method comprising:
loading a hypervisor in a mobile device;
with the hypervisor, affording a first mode of operation of the mobile device and a second mode of operation of the mobile device, the first mode of operation being associated with a diskless operating environment and the second mode of operation being associated with a local disk operating environment; and
with said hypervisor responsive to one or more predetermined criteria hibernating the first mode of operation and affording the second mode of operation.

13. The method according to claim 12, wherein said affording a first mode of operation comprises affording diskless operation responsive to a determination that a needed network connection is available.

14. The method according to claim 12, wherein the first mode of operation is associated with an external network.

15. The method according to claim 12, wherein said affording of a second mode of operation comprises affording local operation responsive to a determination that a needed network connection is not available.

16. The method according to claim 12, wherein the second mode of operation is associated with an operating system of the mobile device.

17. The method according to claim 16, wherein the second mode of operation is further associated with a hard disk drive of the mobile device.

18. The method according to claim 12, further comprising, with the hypervisor, affording a third mode of operation of the mobile device, the third mode of operation being associated with both of the diskless and local disk operating environments.

19. The method according to claim 18, wherein:
the diskless operating environment is an external environment and the local disk operating environment is a local environment; and
said affording of a third mode of operating comprises accepting input from the external environment for use in the local environment.

20. A non-transitory program storage device readable by machine embodying a program of instructions executable by the machine to perform steps comprising:
loading a hypervisor in a mobile device;
with the hypervisor, affording a first mode of operation of the mobile device and a second mode of operation of the mobile device, the first mode of operation being associated with a diskless operating environment and the second mode of operation being associated with a local disk operating environment; and
with said hypervisor, responsive to one or more predetermined criteria, hibernating the first mode of operation and affording the second mode of operation.

* * * * *